(12) United States Patent
Park et al.

(10) Patent No.: US 8,243,214 B2
(45) Date of Patent: Aug. 14, 2012

(54) SCREEN APPARATUS FOR VEHICLE

(75) Inventors: Mi Sun Park, Pusan (KR); Il Sun Kim, Gwangmyung (KR)

(73) Assignees: Korean Railroad Corporation, Deajeon (KR); Jong Chan Kim, Seoul (KR)

( * ) Notice: Subject to any disclaimer, the term of this patent is extended or adjusted under 35 U.S.C. 154(b) by 1063 days.

(21) Appl. No.: 11/956,234

(22) Filed: Dec. 13, 2007

(65) Prior Publication Data
US 2008/0259545 A1 Oct. 23, 2008

(30) Foreign Application Priority Data
Apr. 19, 2007 (KR) .................. 10-2007-0038412

(51) Int. Cl.
*H04N 5/64* (2006.01)
(52) U.S. Cl. .................. 348/837; 348/838; 248/324
(58) Field of Classification Search .............. 348/837, 348/836, 838, 839, 840, 841, 842, 843; 353/13; 359/443; 248/317, 324, 323, 341, 339, 560, 248/576, 610
See application file for complete search history.

(56) References Cited

U.S. PATENT DOCUMENTS

| | | | | |
|---|---|---|---|---|
| 3,640,601 A * | 2/1972 | Murray | .......................... | 359/443 |
| 3,750,995 A * | 8/1973 | Genger | .......................... | 248/324 |
| 4,639,106 A * | 1/1987 | Gradin | ............................ | 353/13 |
| 5,775,762 A | 7/1998 | Vitito | | |
| 5,897,093 A * | 4/1999 | Le Derf | ........................ | 248/628 |
| 6,484,993 B2 * | 11/2002 | Huffman | ........................ | 248/323 |
| 6,695,376 B1 * | 2/2004 | Hirano | .......................... | 296/37.7 |
| 6,992,883 B2 * | 1/2006 | Oh | ........................... | 361/679.05 |
| 7,036,936 B2 * | 5/2006 | Hattori et al. | .................... | 353/13 |
| 7,275,832 B2 * | 10/2007 | Sato | ................................ | 353/13 |
| 7,290,888 B2 * | 11/2007 | Kepley et al. | ................... | 353/79 |
| 7,661,822 B2 * | 2/2010 | Park et al. | ........................ | 353/13 |
| 2005/0200951 A1 * | 9/2005 | Redmon | ........................ | 359/443 |
| 2006/0244700 A1 | 11/2006 | Sano et al. | | |
| 2009/0268164 A1 * | 10/2009 | Bowden et al. | .................. | 353/13 |

FOREIGN PATENT DOCUMENTS

| | | |
|---|---|---|
| CN | 1704287 | 5/2004 |
| DE | 102 26 405 | 7/2003 |
| DE | 102004029792 | 6/2004 |
| JP | 10-2001-0045339 | 5/2001 |
| JP | 2004-182049 | 2/2004 |
| KR | 20-1997-0026295 | 6/1997 |
| KR | 20-1999-0011647 | 3/1999 |
| KR | 20-0207701 | 11/2000 |
| PT | 76034 | 12/1982 |
| RU | 2185537 | 7/1994 |

* cited by examiner

Primary Examiner — Branon Painter

(57) ABSTRACT

A screen apparatus for a vehicle is disclosed. The screen apparatus of the present invention includes a screen (5) for displaying an image thereon, a support frame (10), which supports the screen such that the screen is rotatable between an operation position, at which the screen is perpendicular to a ceiling surface of the vehicle, and a storage position, at which the screen is parallel with the ceiling surface of the vehicle, and a vibration absorbing unit (61), which is provided between the support frame and the ceiling surface of the vehicle and has a plurality of elastic wires (67) for absorbing vibrations transmitted to the support frame in multiple directions. Therefore, the present invention can prevent the screen from undesirably moving, thus making it possible for a user to comfortably watch images.

8 Claims, 7 Drawing Sheets

SCREEN APPARATUS FOR VEHICLE

BACKGROUND OF THE INVENTION

1. Field of the Invention

The present invention relates, in general, to screen apparatuses for vehicles and, more particularly, to a screen apparatus for a vehicle which can absorb vibrations generated in multiple directions when the vehicle travels, thus preventing a screen from undesirably moving.

2. Description of Related Art

Recently, in order to provide comfort and pleasure to traveling passengers, televisions or various kinds of disk players are installed in various kinds of vehicles such that the passengers can watch images while traveling.

For example, disk players are typically provided in automobiles such that passengers can watch images and listen to music. As another example, in large buses, televisions or disk players are provided on the ceilings at positions adjacent to driver's seats such that passengers can watch images and listen to music.

However, in the case of the automobiles or the large buses, there is a restriction that it is difficult to use relatively large screens to watch images, for example, movies.

On the other hand, in the case of railway trains, because the above restriction is overcome, relatively large screens and projection devices, such as projectors, which project images onto the screens, can be installed in the passenger cars, thus passengers can enjoy movies or the like while traveling without any sense of boredom.

Meanwhile, in such railway trains, to prevent the screens from vibrating due to movement of the railway trains, vibration absorbing pads made of rubber or silicone are interposed between the screens and the ceilings of the railway trains.

However, in the case of such a vibration absorbing structure, according to the conventional technique, because the vibration absorbing pad is made of rubber or silicone, there is a problem in that the vibration absorbing pad may not be able to conduct its intended function due to the hardening of material or other reasons with the passage of time.

In an effort to overcome the problems experienced with the conventional technique, the applicant of the present invention developed a screen apparatus for a vehicle which includes a vibration absorbing unit provided with elastic wires between a screen and the ceiling of the vehicle and is constructed such that, when the screen is in an operation position or a storage position, the screen can be firmly supported by a support frame having the vibration absorption unit.

SUMMARY OF THE INVENTION

Accordingly, the present invention has been made keeping in mind the above problems occurring in the prior art, and an object of the present invention is to provide a screen apparatus for a vehicle which can absorb vibrations transmitted to a screen in multiple directions, thus preventing the screen from undesirably moving, so that a user can comfortably watch images.

In order to accomplish the above object, the present invention provides a screen apparatus for a vehicle, including: a screen for displaying an image thereon; a support frame supporting the screen such that the screen is rotatable between an operation position, at which the screen is perpendicular to a ceiling surface of the vehicle to display the image thereon, and a storage position, at which the screen is parallel to the ceiling surface of the vehicle; and a vibration absorbing unit provided between the support frame and the ceiling surface of the vehicle, the vibration absorbing unit having a plurality of elastic wires to absorb vibrations transmitted in multiple directions from the vehicle to the support frame.

Preferably, the vibration absorbing unit may include: a first mounting block fastened to the support frame; a second mounting block fastened to the ceiling surface of the vehicle; and the plurality of elastic wires elastically coupling the first mounting block and the second mounting block to each other, each of the plurality of elastic wires having an arc shape.

Furthermore, the support frame may include: a pair of screen support members placed parallel to each other and rotatably supporting respective opposite edges of the screen; and a connection member connecting the screen support members to each other, the connection member being coupled to the ceiling surface of the vehicle.

In addition, the screen apparatus for the vehicle may further include: a hinge shaft rotatably coupling the screen to the support frame; a guide rail provided on each of the opposite edges of the screen; a movable roller unit having a roller so as to be reciprocable along the guide rail; and a link rotatably coupled at a first end thereof to the support frame and rotatably coupled at a second end thereof to the movable roller unit, so that the link restricts rotation of the screen.

As well, the screen apparatus for the vehicle may further include: a pair of locking units provided in each of the guide rails on respective opposite sides of the movable roller unit, with a locking hook extending from each of the locking units towards the movable roller unit; and a pair of locking holes formed in respective opposite ends of the movable roller unit, so that the locking hook of one locking unit, selected depending on whether the screen is in the operation position or the storage position, is locked to the corresponding locking hole.

Moreover, the screen apparatus for the vehicle may further include a spring provided in each of the locking units to provide elastic force to the locking hook of the locking unit such that the locking hook maintains a state of being locked to the corresponding locking hole.

Preferably, the screen apparatus for the vehicle may further include a stopper to restrict the rotation of the screen with respect to the support frame when the screen is in the operation position or the storage position.

Furthermore, the stopper may include: a pair of balls provided in each of the guide rails, with the corresponding screen support member disposed between the balls; and a plurality of ball seating holes formed in each of the screen support members at predetermined positions corresponding to the operation position and the storage position of the screen, so that the balls are removably seated into the ball seating holes.

In the screen apparatus for a vehicle according to the present invention, a vibration absorbing unit having a plurality of elastic wires is provided between the ceiling surface of the vehicle and a support frame for supporting a screen, so that vibrations transmitted from the ceiling of the vehicle in multiple directions are efficiently absorbed by the elastic wires of the vibration absorbing unit. Therefore, the present invention can prevent the screen from undesirably moving, thus making it possible for a user to comfortably watch images.

DETAILED DESCRIPTION OF THE INVENTION

Hereinafter, a preferred embodiment of the present invention will be described in detail with reference to the attached drawings.

Figure 1:
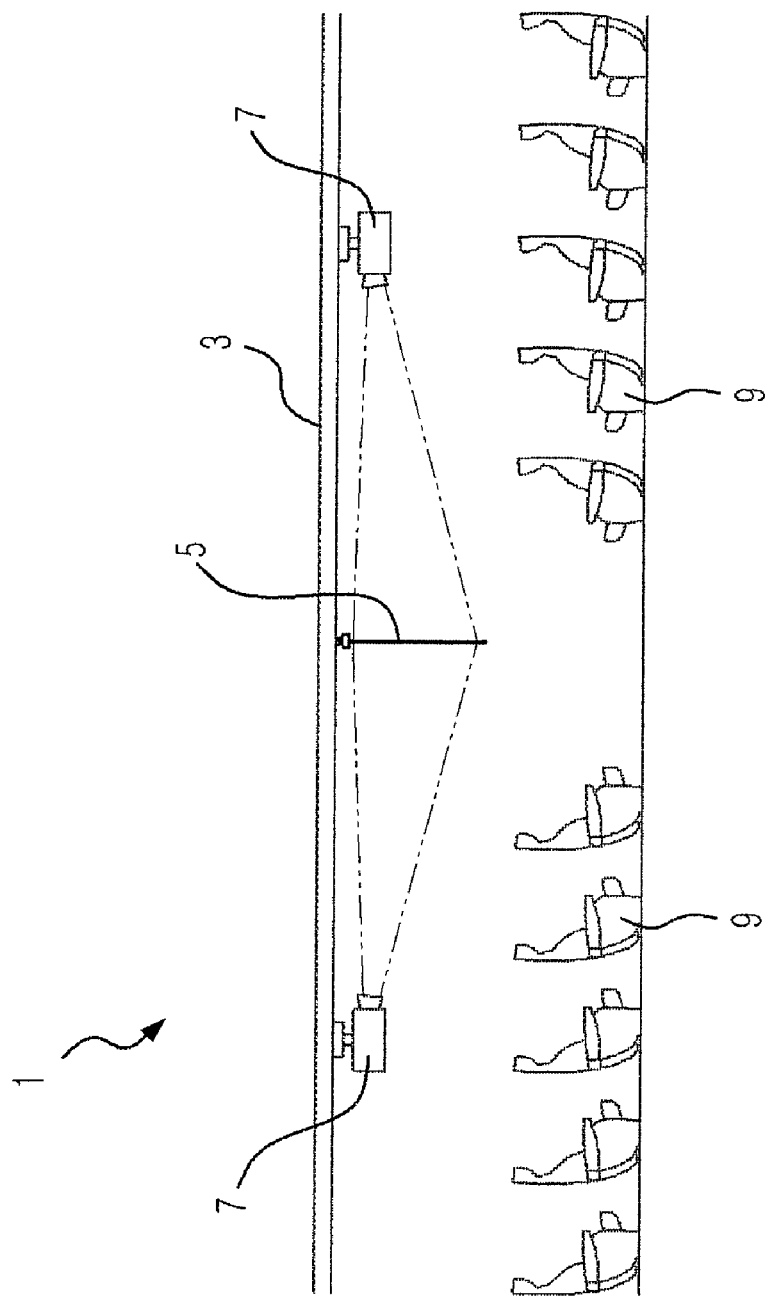
FIG. 1 is a schematic view illustrating a screen apparatus used in a railway train, according to a preferred embodiment of the present invention.
Figure 2:
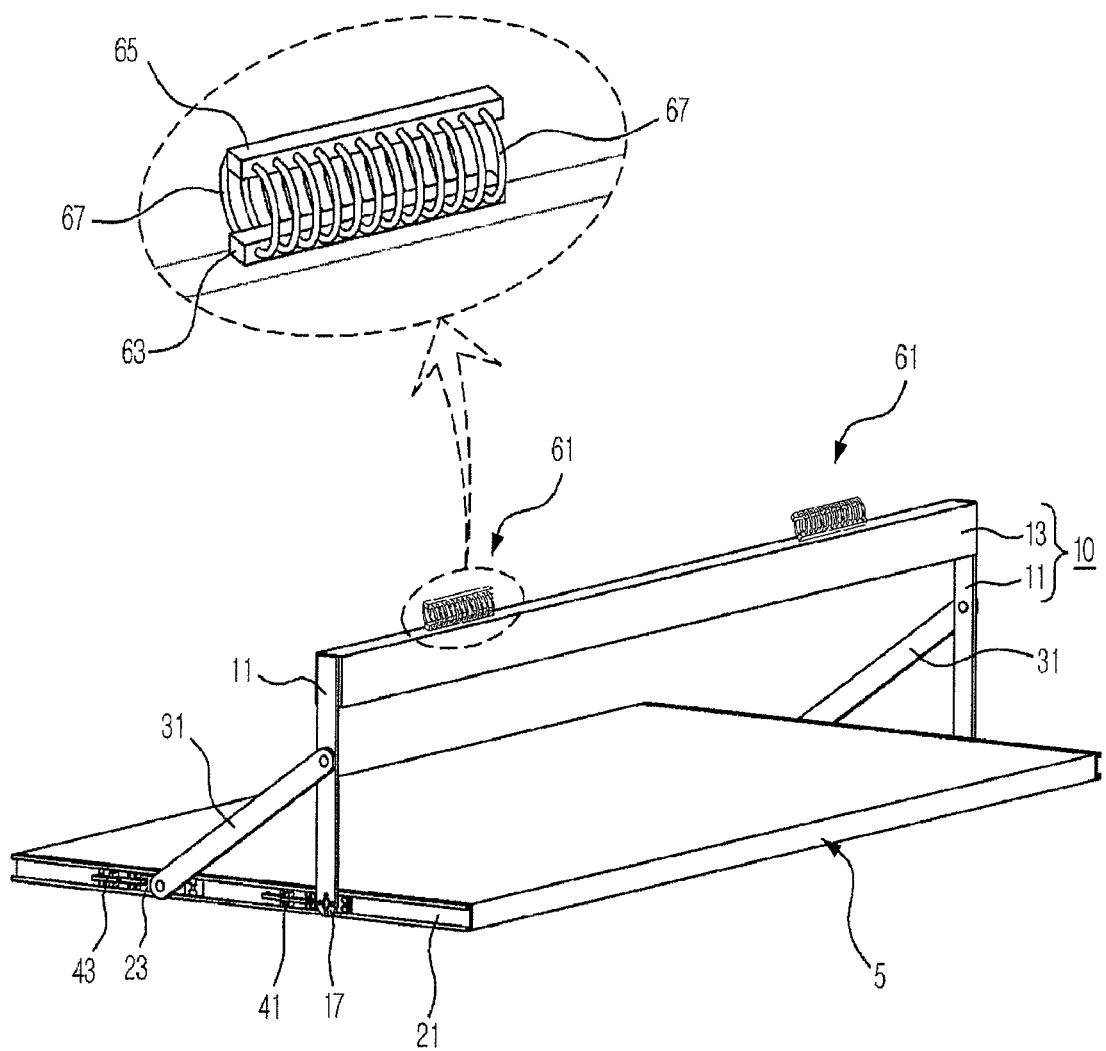
FIG. 2 is a perspective view showing the state of the screen apparatus when the screen is in a storage position according to the present invention.

In the following description, as one example of a vehicle, the case in which the screen apparatus of the present invention is applied to a railway train will be described. FIG. 1 is a view schematically illustrating the screen apparatus of the present invention used in a railway train.

As shown in the drawing, for the application of the present invention, the railway train 1 has a screen 5, projection devices 7 and seats 9, which are arranged in directions such that they face each other based on the screen.

The screen 5 is provided approximately in the middle of a ceiling surface 3 in the railway train 1 and is constructed such that images can be projected onto both opposite surfaces of the screen 5.

The projection devices 7 are mounted on the ceiling surface 3 of the railway train 1 on opposite sides of the screen 5 at positions spaced apart from the screen 5 by predetermined distances. The projection devices 7 serve to project stored images onto the screen 5.

Here, preferably, the opposite projection devices 7 project the same image onto the respective opposite surfaces of the screen 5, but the present invention is not limited to this. In other words, the projection devices 7 may project different images onto the respective opposite surfaces of the screen 5.

As such, the screen 5 is disposed at the medial position in the railway train 1, and the seats 9 are arranged in the railway train 1 in directions facing each other at opposite positions based on the screen 5.

Meanwhile, as shown in FIGS. 2 through 7, the screen 5 is supported by a support frame 10 such that it is rotatable between an operation position, in which the screen 5 is perpendicular to the ceiling surface 3 of the railway train 1 for the display of an image, and a storage position, at which the screen 5 is parallel to the ceiling surface 3 of the railway train 1.

The support frame 10 includes a pair of screen support members 11, which are provided parallel to each other and rotatably support the opposite edges of the screen 5, and a connection member 13, which connects the screen support members 11 to each other and is coupled to the ceiling surface 3 of the railway train 1.

The support frame 10 and the screen 5 are rotatably coupled to each other by a hinge shaft 17.

Furthermore, a guide rail 21, one surface of which is open, is provided on each of the opposite edges of the screen 5.

A movable roller unit 23 is provided in each guide rail 21 such that it can reciprocate along the guide rail 21. The movable roller unit 23 includes a pair of rollers 25, which conduct rolling movement, and a roller bracket 27, which rotatably supports the rollers 25. The roller bracket 27 has on opposite ends thereof locking holes 29, to which respective locking hooks 45, which will be explained later herein, are locked.

The movable roller unit 23 is coupled to the support frame 10 through a link 31.

The link 31 has a bar shape and is rotatably coupled at the first end thereof to the support frame 10 and is rotatably coupled at the second end thereof to the movable roller unit 23.

Furthermore, two locking units are provided in each guide rail 21 on respective opposite sides of the movable roller unit 23. Hereinafter, for convenience of description, the locking unit, which is disposed at the right position in the drawings, that is, adjacent to the hinge shaft 17, will be called the first locking unit 41, and the locking unit, which is disposed at the left position in the drawings, will be called the second locking unit 43.

The locking hooks 45 protrude from the respective first and second locking units 41 and 43 towards the movable roller unit 23, so that each locking hook 45 is releasably locked to the corresponding locking hole 29 of the movable roller unit 23. The locking hooks 45 are rotatably coupled to the respective first and second locking units 41 and 43. Thus, the locking hook 45 of the first or second locking unit 41 or 43 is selectively locked to the corresponding locking hook 45 depending on whether the screen 5 is in the operation position or the storage position such that the movable roller unit 23 is selectively locked to one of the locking units.

In addition, each locking unit 41, 43 includes a spring 47 for providing elastic force to the corresponding locking hook 45. The spring 47 is provided between each locking unit 41, 43 and the base surface of the guide rail 21. Thus, the spring 47 provides elastic force to the locking hook 45 such that, when the locking hook 45 is locked to the corresponding locking hole 29, the locking hook 45 can maintain the locked state.

Meanwhile, the screen apparatus for vehicles according to the present invention further includes stoppers 51, which restrict the rotation of the screen 5 with respect to the support frame 10 between the operation position and the storage position.

Each stopper 51 includes a pair of balls 53, which are provided in each guide rail 21 and contact the corresponding screen support member 11, and a plurality of ball seating holes 55, into which the balls 53 are removably seated.

Figure 5:
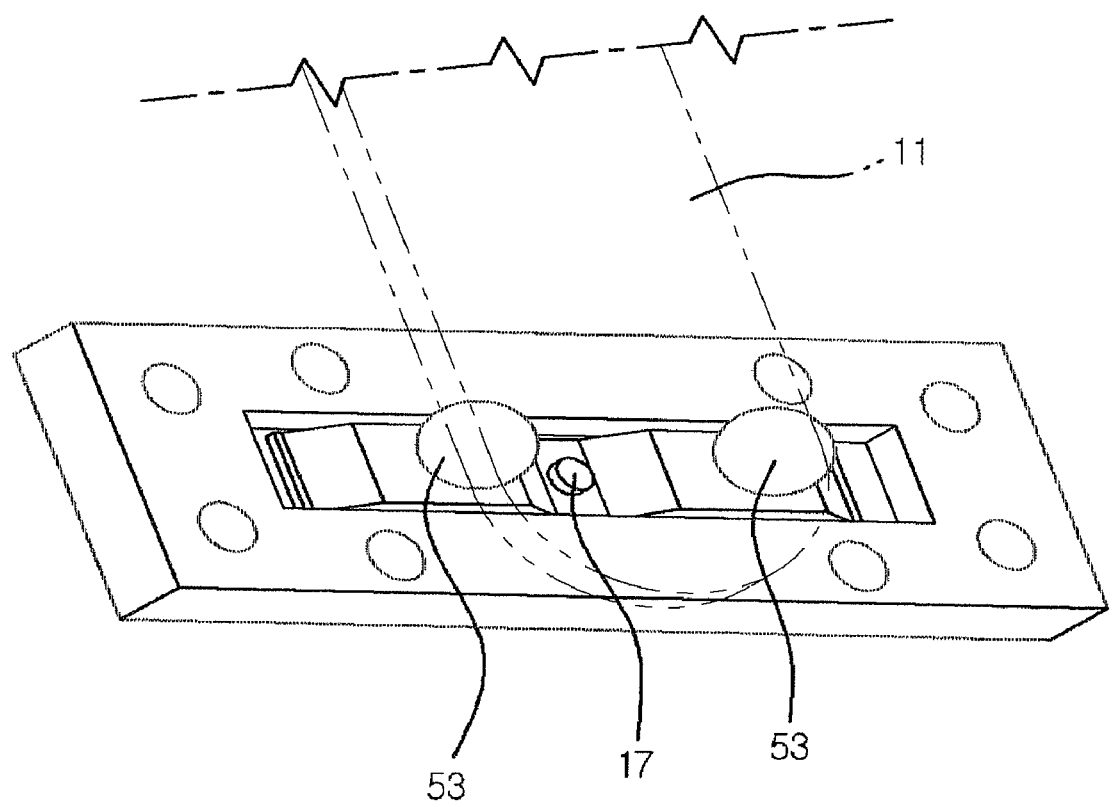
FIG. 5 is a perspective view showing a critical part of a stopper of FIG. 4.

As shown in FIG. 5, each ball 53 has a spherical shape, and the balls 53 are spaced apart from each other by a predetermined distance, with the screen support member 11 disposed therebetween.

Each ball seating hole 55 has a hemispherical shape corresponding to the shape of the ball 53. The ball seating holes 55 are formed in the surface of each screen support member 11, which faces the corresponding guide rail 21 of the screen 5, around the corresponding hinge shaft 17. In this embodiment, four ball seating holes 55 are formed spaced apart from each other at regular angular intervals, that is, at an angle of 90°. In response to this, the operation position and the storage position of the screen 5 form an angle of 90° therebetween. Thus, when the screen 5 is rotated, relative to the support frame 10, to the operation position or the storage position, the balls 53, which are provided in the guide rails 21 of the screen 5, are selectively seated into the corresponding ball seating holes 55 of the screen support members 11 of the support frame 10 depending on whether the screen 5 is in the operation position or the storage position. Here, in the present invention, four or more ball seating holes 55 may be formed around the hinge shaft 17 at positions spaced part from each other at regular angular intervals.

Moreover, the screen apparatus for vehicles according to the present invention may further includes vibration absorption units 61, which are provided in the support frame 10 and the ceiling surface 3 of the railway train 1 to absorb vibrations transmitted from the ceiling surface 3 of the railway train 1 to the support frame 10 in multiple directions.

Each vibration absorbing unit 61 includes a first mounting block 63, which is fastened to the support frame 10, a second mounting block 65, which is fastened to the ceiling surface 3 of the railway train 1, and a plurality of elastic wires 67, which elastically couple the first mounting block 63 to the second mounting block 65.

Each elastic wire 67 has an arc shape and is formed by bending a wire having a predetermined length such that the opposite ends thereof face each other.

The elastic wires 67 are inserted through one selected from the first mounting block 63 and the second mounting block 65 at positions spaced apart from each other at regular intervals, and the opposite ends of the elastic wires 67 are coupled to the other one of the first mounting block 63 and the second mounting block 65 at positions spaced apart from each other at regular intervals such that the opposite ends of each of the elastic wires 67 face each other. Thus, each elastic wire 67 of the vibration absorbing unit 61 generally forms an arc shape, that is, a coil shape.

Meanwhile, when vibrations are transmitted from the ceiling surface 3 of the railway train 1 to the vibration absorbing unit 61, the elastic wires 67, which elastically couple the first mounting block 63 and the second mounting block 65 to each other, conduct flexion-extension movement, thus absorbing vibrations in multiple directions, thereby preventing the screen 5 from vibrating.

The vibration absorbing unit 61 has high elasticity and superior vibration absorbing ability compared to a conventional vibration absorbing rubber pad. Therefore, a superior vibration absorbing effect is ensured.

Here, the number, elasticity and size of the elastic wires 67 are determined depending on the weight of the screen 5 and the intensity of expected vibration.

Furthermore, it is preferable that each elastic wire 67 be made of stainless material, having superior corrosion resistance and high durability, such that it can be used on a semi-permanent basis.

The operation of the screen apparatus for vehicles according to the present invention having the above-mentioned construction will be described herein below.

Figure 3:
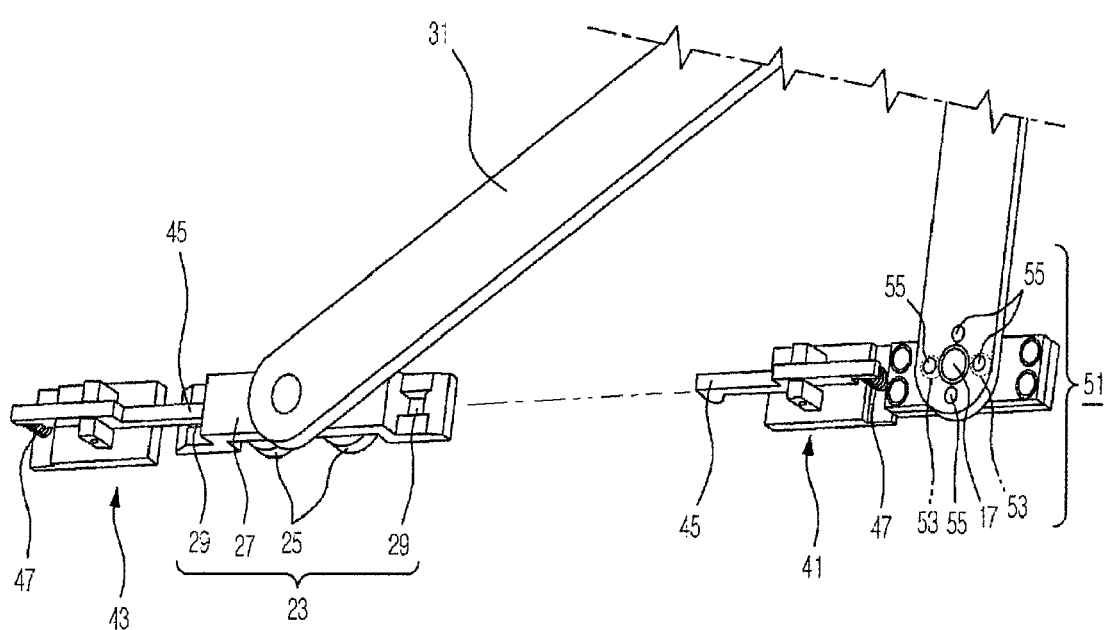
FIG. 3 is an enlarged view of a critical part of FIG. 2.

First, as shown in FIG. 3, when the screen 5 is in the storage position, at which it is parallel to the ceiling surface 3 of the railway train 1, the state of the screen apparatus will be explained herein below.

Figure 4:
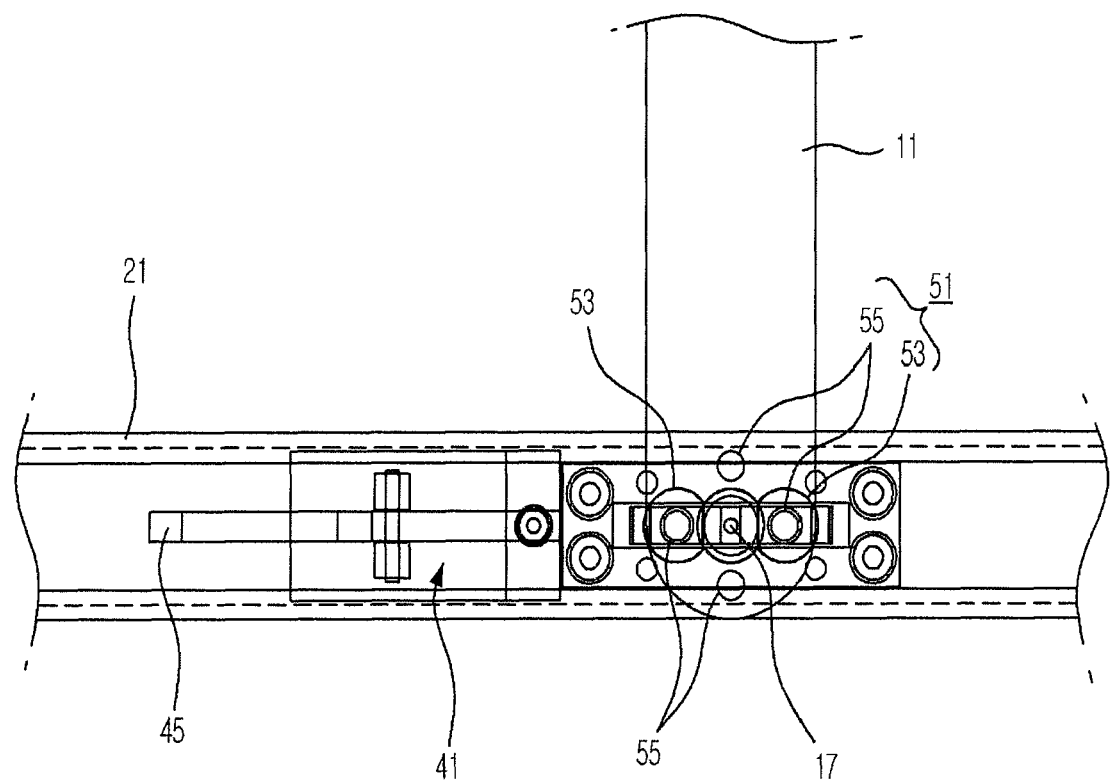
FIG. 4 is an enlarged front view of the critical part of FIG. 2.

As shown in FIG. 4, when the screen 5 is in the storage position, each movable roller unit 23 is spaced apart from the first locking unit 41 and is disposed adjacent to the second locking unit 43, and the locking hook 45 of the second locking unit 43 is locked to the locking hole 29 of the movable roller unit 23.

In this case, the locking hook 45 of the second locking unit 43 reliably maintains the state in which it is locked to the locking hole 29 of the movable roller unit 23 by the elastic force of the spring 47 which is provided in the second locking unit 43. Furthermore, each link 31 forms an acute angle with the corresponding screen support member 11 of the support frame 10, and the screen support member 11 and the screen 5 are at right angles to each other. In addition, as shown in FIG. 5, in the state in which the screen support member 11 and the screen 5 are at right angles to each other, the two balls 53 are seated into and locked to two of the ball seating holes 55 of the screen support member 11, respectively corresponding thereto, so that the screen 5 is prevented from undesirably rotating with respect to the screen support member 11.

Thanks to the above-mentioned structure, the screen 5 can maintain its orientation parallel to the ceiling surface 3 of the railway train 1 and reliably remain in its storage position even if a predetermined external force is applied thereto.

Figure 6:
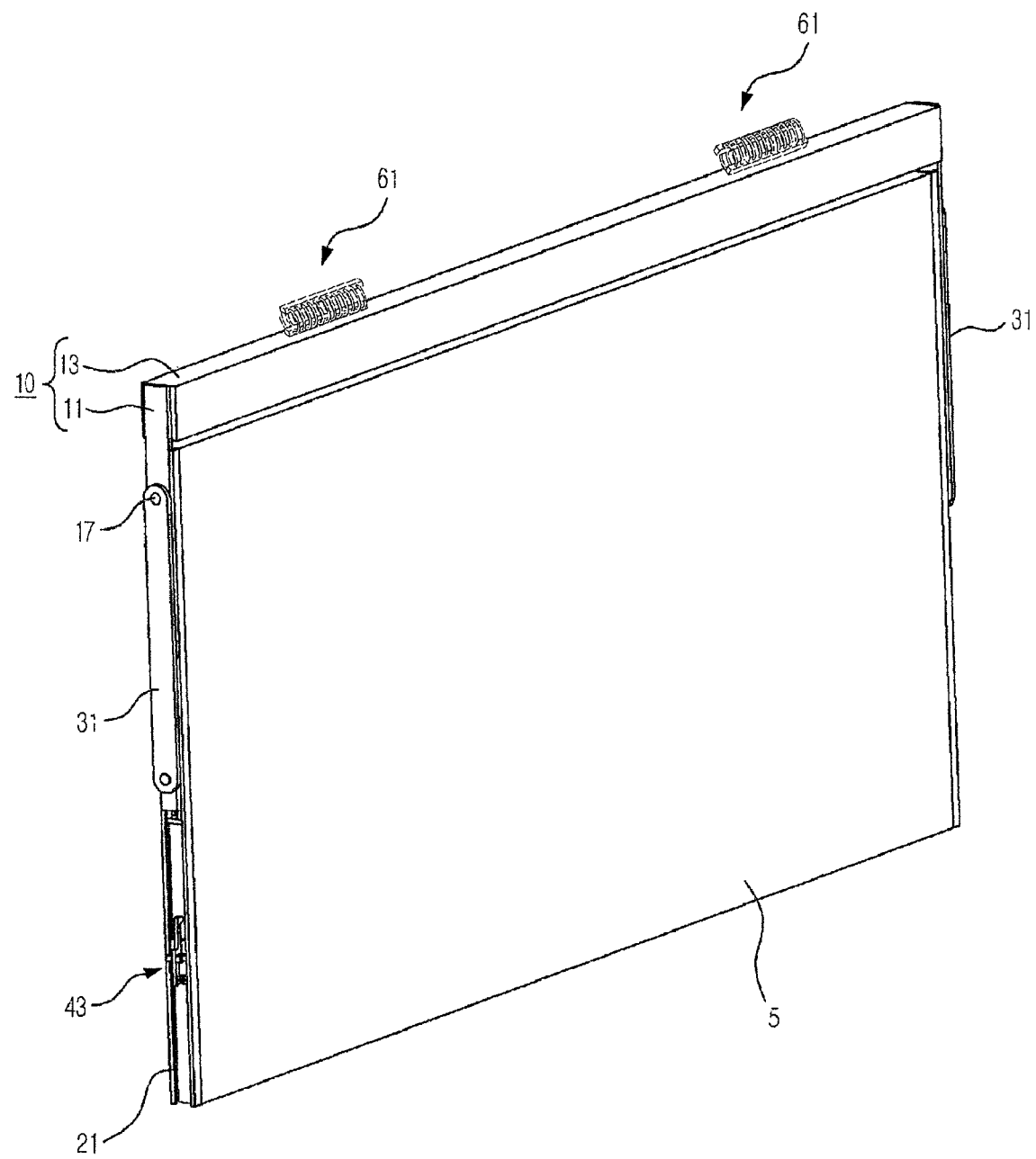
FIG. 6 is a perspective view showing the state of the screen apparatus when the screen is in an operation position according to the present invention.

Next, as shown in FIG. 6, when the screen 5 is in the operation position, at which it is perpendicular to the ceiling surface 3 of the railway train 1, the state of the screen apparatus will be explained herein below.

Figure 7:
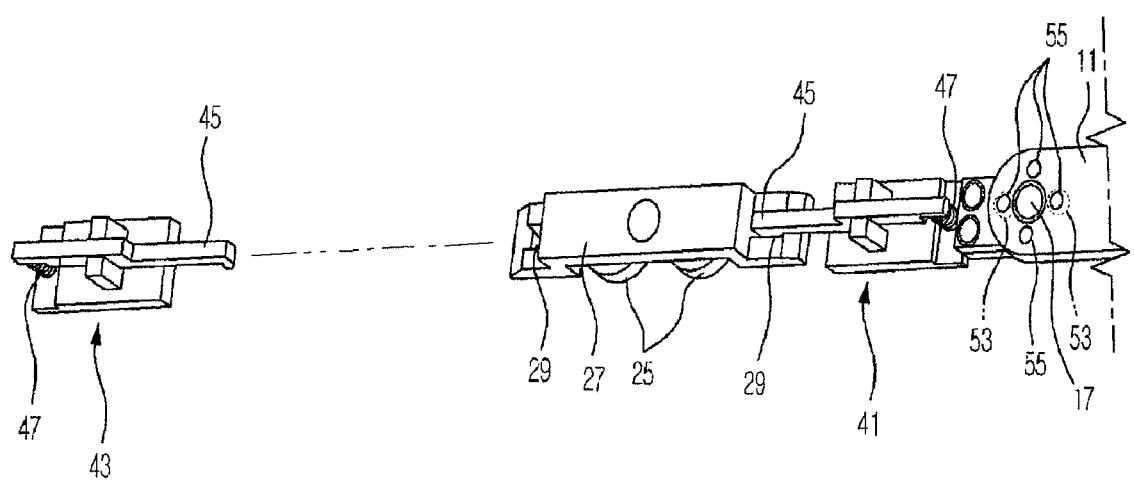
FIG. 7 is an enlarged view of the critical part of FIG. 5, from which a link is omitted.

When rotating the screen 5, which has been in the storage position, to the operation position, as shown in FIG. 7, the movable roller unit 23 is moved away from the second locking unit 43 and is disposed adjacent to the first locking unit 41. The locking hook 45 of the first locking unit 41 is locked to the corresponding locking hole 29 of the movable roller unit 23. Here, in FIG. 7, for ease of understanding of the coupling relationship between the movable roller unit 23 and the first locking unit 41, the movable roller unit 23 and the first locking unit 41 are illustrated alone, without showing the link 31.

In this case, the locking hook 45 of the first locking unit 41 reliably maintains the state in which it is locked to the corresponding locking hole 29 of the movable roller unit 23 by the elastic force of the spring 47, which is provided in the first locking unit 41. Furthermore, each link 31 is parallel with the corresponding screen support member 11 of the support frame 10, so that the screen support member 11 and the screen 5 are parallel to each other. In addition, in the state in which the screen support member 11 and the screen 5 are parallel to each other, the two balls 53 are seated into and locked to two other respectively corresponding ball seating holes 55 of the screen support member 11, so that the screen 5 is prevented from undesirably rotating from the operation position towards the storage position.

Thanks to this structure, the screen 5 can maintain its orientation perpendicular to the ceiling surface 3 of the railway train 1 and reliably remain in its operation position even though predetermined external force is applied thereto.

Meanwhile, in the present invention, even if vibrations are transmitted from the ceiling surface 3 of the railway train 1 to the screen 5 through the support frame 10 in multiple directions when the railway train 1 travels, the elastic wires 67 of the vibration absorbing unit 61, which are provided between the ceiling surface 3 of the railway train 1 and the support frame 10 for supporting the screen 5, conduct flexion-extension movement, thus absorbing the vibrations transmitted in multiple directions. Thereby, the screen 5 is prevented from undesirably moving, so that the screen 5 can stably remain in its intended position.

As such, because the screen 5 is prevented from moving, passengers in the railway train 1 can enjoy reduced eye strain and thus comfortably watch images.

Furthermore, in the case of long trips, the passengers can comfortably watch movies or the like, so that they can comfortably enjoy traveling without any sense of boredom.

Meanwhile, in the above-described embodiment, although the railway train has been illustrated as one example of the vehicle, the technique of the present invention can of course be applied to automobiles or other vehicles.

Furthermore, those skilled in the art will appreciate that the present invention is not limited to the above-mentioned embodiment, and that various modifications, additions and substitutions are possible, without departing from the scope and spirit of the invention. Therefore, such modifications, additions and substitutions must be regarded as falling within the bounds of the claims of the present invention.

What is claimed is:

1. A screen apparatus for a vehicle, comprising:
   a screen for displaying an image thereon;
   a support frame supporting the screen such that the screen is rotatable between an operation position, at which the screen is perpendicular to a ceiling surface of the vehicle to display the image thereon, and a storage position, at which the screen is parallel to the ceiling surface of the vehicle;
   a hinge shaft rotatably coupling the screen to the support frame;
   a guide rail provided on each of the opposite edges of the screen;
   a movable roller unit having a roller so as to be reciprocable along each guide rail
   a link rotatably coupled at a first end thereof to the support frame and rotatably coupled at a second end thereof to the movable roller unit, so that the link restricts rotation of the screen; and
   a vibration absorbing unit provided between the support frame and the ceiling surface of the vehicle, the vibration absorbing unit having a plurality of elastic wires to absorb vibrations transmitted in multiple directions from the vehicle to the support frame.

2. The screen apparatus for the vehicle according to claim 1, wherein the vibration absorbing unit comprises:
   a first mounting block fastened to the support frame;
   a second mounting block fastened to the ceiling surface of the vehicle; and
   the plurality of elastic wires elastically coupling the first mounting block and the second mounting block to each other, each of the plurality of elastic wires having an arc shape.

3. The screen apparatus for the vehicle according to claim 2, wherein the support frame comprises:
   a pair of screen support members placed parallel to each other and rotatably supporting respective opposite edges of the screen; and
   a connection member connecting the screen support members to each other, the connection member being coupled to the ceiling surface of the vehicle.

4. The screen apparatus for the vehicle according to claim 1, wherein the support frame comprises:
   a pair of screen support members placed parallel to each other and rotatably supporting respective opposite edges of the screen; and
   a connection member connecting the screen support members to each other, the connection member being coupled to the ceiling surface of the vehicle.

5. The screen apparatus for the vehicle according to claim 1, further comprising:
   a pair of locking units provided in each of the guide rails on respective opposite sides of the movable roller unit, with a locking hook extending from each of the locking units towards the movable roller unit; and
   a pair of locking holes formed in respective opposite ends of the movable roller unit, so that the locking hook of one locking unit, selected depending on whether the screen is in the operation position or the storage position, is locked to the corresponding locking hole.

6. The screen apparatus for the vehicle according to claim 5, further comprising:
   a spring provided in each of the locking units to provide elastic force to the locking hook of the locking unit such that the locking hook maintains a state of being locked to the corresponding locking hole.

7. The screen apparatus for the vehicle according to claim 1, further comprising:
   a stopper to restrict the rotation of the screen with respect to the support frame when the screen is in the operation position or the storage position.

8. The screen apparatus for the vehicle according to claim 7, wherein the stopper comprises:
   a pair of balls provided in each of the guide rails, with the corresponding screen support member disposed between the balls; and
   a plurality of ball seating holes formed in each of the screen support members at predetermined positions corresponding to the operation position and the storage position of the screen, so that the balls are removably seated into the ball seating holes.

* * * * *